United States Patent [19]

Wernicke et al.

[11] 4,188,281
[45] Feb. 12, 1980

[54] TWO-STAGE PRODUCTION OF OLEFINS UTILIZING A FAUJASITE STRUCTURE ZEOLITE IN HYDROGENATION STAGE

[75] Inventors: Hans J. Wernicke, Wolfratshausen; Allan Watson, Ottobrunn; Walter Kreuter, Penzberg; Manfred Mansmann; Horst Weber, both of Leverkusen, all of Fed. Rep. of Germany

[73] Assignees: Linde Aktiengesellschaft, Wiesbaden; Bayer Aktiengesellschaft, Leverkusen, both of Fed. Rep. of Germany

[21] Appl. No.: 905,486

[22] Filed: May 12, 1978

[30] Foreign Application Priority Data

May 12, 1977 [DE] Fed. Rep. of Germany ....... 2721503
Apr. 12, 1978 [DE] Fed. Rep. of Germany ....... 2815859

[51] Int. Cl.$^2$ .......................... C10G 23/02; C10G 9/46
[52] U.S. Cl. ......................................... 208/57; 208/89; 585/251; 585/275; 585/276; 585/277; 585/324; 585/648
[58] Field of Search ................... 208/57, 58, 89, 143; 260/683 R

[56] References Cited

U.S. PATENT DOCUMENTS

| | | | |
|---|---|---|---|
| 3,472,909 | 10/1969 | Raymond | 208/57 |
| 3,510,258 | 5/1970 | Hindin et al. | 23/113 |
| 3,527,695 | 9/1970 | Lawrance et al. | 208/143 |
| 3,598,721 | 8/1971 | Haensel | 208/57 |
| 3,720,729 | 3/1973 | Sze et al. | 208/57 |
| 3,723,299 | 3/1973 | Seitzer | 208/143 |
| 3,779,899 | 12/1973 | Mears | 208/143 |
| 3,781,195 | 12/1973 | Davis et al. | 208/57 |
| 3,898,299 | 8/1975 | Jones | 208/57 |
| 4,017,380 | 4/1977 | Byler et al. | 208/58 |
| 4,061,562 | 12/1977 | McKinney et al. | 208/57 |
| 4,097,363 | 6/1978 | McKinney et al. | 208/89 |

*Primary Examiner*—George Crasanakis
*Attorney, Agent, or Firm*—Millen & White

[57] ABSTRACT

In a process for the production of olefins in two stages wherein, in the first stage, heavy petroleum fractions are hydrogenated in the presence of hydrogen and a hydrogenation catalyst and, in the second stage, the thus-hydrogenated fractions are subjected to thermal cracking the presence of steam, the improvement which comprises employing as the hydrogenation catalyst a zeolite of the faujasite structure combined with elements from Groups VIB, VIIB and VIII of the periodic table of the elements, wherein the alkali component of the zeolite is exchanged at least partially for ammonium, hydronium, alkaline earth and/or rare earth ions, and the elements are present in a metallic, ionic, oxidic and/or sulfidic form.

22 Claims, No Drawings

TWO-STAGE PRODUCTION OF OLEFINS UTILIZING A FAUJASITE STRUCTURE ZEOLITE IN HYDROGENATION STAGE

BACKGROUND OF THE INVENTION

This invention relates to a process for the production of olefins, especially a two stage process wherein, in the first stage, heavy petroleum fractions are hydrogenated in the presence of hydrogen and a hydrogenation catalyst and, in the second stage, the thus-hydrogenated fractions are subjected to thermal cracking in the presence of steam.

Such a process has been known from DOS [German Unexamined Laid-Open Application] 2,164,951, an also U.S. Pat. Nos. 3,720,729 of Sze et al, Mar. 13, 1973 and 3,781,195 of Davis et al, Dec. 25, 1973. In contrast to a direct thermal cracking of heavy crude oil fractions, wherein a great amount of pyrolysis oil, tar, and coke is produced in addition to a minor yield, it is possible by means of the conventional method to produce, by catalytic hydrogenation of the crude oil fractions prior to thermal cracking, hydrogenated fractions which are suitable for thermal cracking.

In the process of DOS No. 2,164,951, the hydrogenation catalysts employed were combinations of nickel or cobalt with molybdenum or tungsten on alumina or silicic acid-alumina. Best results were achieved with the combination of nickel/tungsten-silicic acid/alumina. As demonstrated by the examples in the aforementioned reference, the hydrogenation is conducted as a discontinuous process in an autoclave with the use of long reaction periods. The weight ratio of the amount of raw material to the amount of catalyst employed ranges between 0.33 and 4; the reaction times range between 8 hours and 75 hours. Consequently, very low space-time yields are obtained for this method which are economically unacceptable for a technical, continuous process. Thus, due to the low activity of the catalysts employed, the process of DOS No. 2,164,951 is relatively very expensive.

SUMMARY OF THE INVENTION

An object of this invention is to provide an improvement in the two stage process for the production of olefins.

Another object is to provide an improvement in the hydrogenation stage by itself.

Upon further study of the specification and appended claims, further objects and advantages of this invention will become apparent to those skilled in the art.

To attain these objects, there is provided for the hydrogenation stage a hydrogenation catalyst consisting essentially of a zeolite of the faujasite structure and of elements of substances based on elements of Groups VIB, VIIB and VIII of the Periodic Table of the Elements (E. H. Sargent & CO.), wherein the alkali metal ion component of the zeolite is exchanged at least partially exchanged for ammonium, hydronium, alkaline earth and/or rare earth ions, and wherein the elements are present in a metallic, ionic, oxidic and/or sulfidic form. (The elements of groups VIB, VIIB and VIII include Cr, Mo, W, Mn, Re, Fe, Co, Ni, Pu, Rh, Pd, Re, Os, and Ir.)

Especially suitable proved to be the elements cobalt, nickel and/or iron in combination with molybdenum, tungsten and/or chromium.

The catalysts employed according to this invention possess a substantially higher activity and selectivity than the conventional catalysts. Due to the higher activity of the hydrogenation catalysts, the heavy petroleum fractions can be conducted through the first stage at a higher volumetric throughput. Thus, it is possible to utilize, in the hydrogenation as conducted in accordance with this invention, a hydrogenation apparatus having smaller spatial dimensions. Due to the high space-time yield, the process of this invention, with the use of these catalysts, is particularly suitable for a continuous, large-scale technical plant. The process of the invention can also be economically conducted under a low hydrogen pressure—which is even more practicable from the viewpoint of thermodynamics.

A further advantage displayed by the catalysts of the invention is their longer lifetime as compared to the conventional catalysts supported on silicic acid or alumina. A regeneration or replacement of the catalysts of the present invention need only be effected at intervals of several years, whereas the regeneration or replacement of the conventional catalysts must take place normally after only about one year.

Zeolites having a faujasite structure are usually subdivided, in correspondence with their $SiO_2:Al_2O_3$ ratio, into zeolite X and zeolite Y. Zeolite X satisfies approximately the following formula:

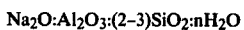

$Na_2O:Al_2O_3:(2-3)SiO_2:nH_2O$

Zeolite Y corresponds approximately to the following formula:

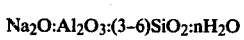

$Na_2O:Al_2O_3:(3-6)SiO_2:nH_2O$ (n=0–8)

The production of these zeolites has been disclosed, for example, in DAS [German Published Application] 1,038,016 and DAS No. 1,098,929.

Zeolites X and Y are structurally distinguishable from the silicic acid/alumina or alumina supports described in DOS No. 2,164,951. In contrast to these prior art supports which have a broad range of pore sizes and are normally amorphous or moderately crystallized, the aforementioned zeolites exhibit an orderly spatial structure, the special feature of which is the regular disposition of voids and pores, the diameter thereof being uniformly around 9 Å. Furthermore, the alkali metal ions thereof can be exchanged by ion exchange for other mono- or polyvalent ions. For technical use, the zeolites are usually employed as molded components, for example in the form of spheres, rods, or the like. In this connection, binders can be added such as, for example, clays, silicic acid, aluminum compounds; generally, the quantities of binder range between 5% and 25% by weight. Processes for conducting the molding step are described, for example, in DAS Nos. 1,040,005 or 1,165,562.

The molding step is suitably conducted prior to the ion exchange step, but the reverse procedure is likewise possible.

The total concentration of the hydrogenating elements of Group VIB, VIIB and VIII, e.g., Fe, Co, Ni, Mo, W, Cr can very within wide limits, for example, calculated as the oxide, between 2% and 30% by weight, based on the weight of the total catalyst. Preferred are concentrations of between 5% and 25% by weight. The ratio of the elements of Group VIII to those of Group VIB ranges approximately between the molar ratios of 0.1 and 10, preferably between 0.3 and 3.

For producing the zeolites X and Y incorporating the hydrogenating metals, several methods can be utilized. A preferred method resides in impregnating the exchanged zeolite with a solution of the desired hydrogenating metals in the form of their commercially available salts, especially under vacuum. The catalysts can also be obtained by coprecipitation of the hydrogenation components in the presence of the zeolite. Also usable is a partial ion exchange with Fe, Ni, and/or Co ions, and subsequent impregnation with a solution of a Cr-molybdenum and/or tungsten compound in order to obtain the catalysts. It is further possible to granulate ion-exchanged zeolite powders with the separately produced mixtures of the hydrogenation components.

Prior to their use, the catalysts are preferably subjected to a pretreatment, which comprises exposing the catalysts after drying to thermal activation. For this purpose, the catalysts are heated for between 30 minutes and 10 hours to temperatures of between 200° and 700° C. and tempered for up to 5 hours at the final temperature. During thermal activation, it is possible to operate under reducing conditions, for example in an $H_2$- or $H_2/N_2$-stream. It is also possible to sulfide the catalyst during this treatment, for example by admixing $H_2S$ to the $H_2$-stream.

In the normal case, the reduced, sulfided form of the catalyst will be obtained automatically during its use. The pretreatment merely shortens the startup time of the catalyst.

It is of advantage for the hydrogenation temperature to be between 100° and 500° C., especially between 200° and 400° C. If the temperature is lower than 100° C., the reaction rate is generally too low for competitive purposes. Likewise, if the temperature exceeds 500° C., then the hydrogen pressure must also be very high for reasons of thermodynamics, whereby the process of this invention again becomes generally economically noncompetitive.

The hydrogen pressure required for conducting the hydrogenation stage of this invention is between 10 and 300 bar. A pressure between 15 and 150 bar is especially advantageous. If the pressure is lower than 10 bar, the hydrogenation ceases for all practical purposes. A pressure above 300 bar, on the other hand, would require a plant design, though technically feasible, resulting in extraordinarily high investment costs.

The hydrogenation is conducted essentially in the liquid phase and the thermal cracking in the vapor phase.

The process of this invention can be utilized, in particular, with gas oils which, under atmospheric pressure, exhibit a boiling range of between 190° and 380° C. However, it is also possible to use petroleum fractions which boil under atmospheric pressure in a range between 380° and 700° C. Petroleum fractions having such a boiling range are unsuitable for direct thermal cracking, since besides a small yield of olefins, relatively undesirable by products are produced, e.g. are pyrolysis oil, coke, and tar. Whereas, pyrolysis oil can be used merely for combustion purposes, and the two latter products contaminate the conduits and heat exchangers. Since the heavy crude oil fractions, however, are very reasonable in price, the exploitation thereof is very desirable from the viewpoint of economy.

It is advantageous if the hourly volume rate (volume petroleum per volume of catalyst per hour) of the petroleum fractions ranges between 0.2 and 10 $h^{-1}$, preferably between 1.5 and 10 $h^{-1}$. Especially favorable is the range between 5 and 10 $h^{-1}$. The lower limit of the aforementioned range means that, due to a long residence time of the feed on the catalyst, a great amount of crude oil is converted. At an even lower rate, a large hydrogenation apparatus must be available for a small thermal cracking furnace, which would be undesirable from an economic viewpoint. The most advantageous situation would be wherein the volume rate in the first stage is as high as in the subsequent second stage. (A high volume rate is desirable in the thermal cracking zone, since under such conditions a conversion of the cracked products into the starting fractions is highly unlikely.) Conversely, the volume rate in the first stage, however, must not be too high, since this would result in too short a residence time of the starting material on the catalyst of the first stage, and no longer provide adequate hydrogenation of the heavy petroleum fractions.

If the catalytic hydrogenation is conducted with a catalyst of this invention under the above-described conditions, the aromatic, especially the polyaromatic compounds are degraded, and in part split by the hydrogenation. Furthermore, the heterocyclic compounds are also cracked by hydrogenation, thus forming $H_2S$, $H_2O$ and $NH_3$. The paraffins and naphthenes contained in the starting fractions remain unchanged during the course of the hydrogenation. Isomerization reactions, which are undesirable in view of the olefin yield in the second process stage are almost entirely suppressed.

Due to the special acidity of the described, decationized or exchanged zeolites, low-boiling hydrogenation products are formed by hydrogenating decomposition reactions which, with respect to their properties, correspond to the naphtha heretofore used in most cases for the olefin manufacture.

In the thermal cracking stage following the first stage, olefins are produced. In this connection, it is most advantageous if the resultant hydrogenated fractions are thermally cracked at a temperature of between 700° and 900° C., under a pressure of 1–4 bar, at a residence time of 0.01–1 second, and a steam dilution of 0.2–4.0 kg. steam/kg, advantageously 0.25–1 kg. steam/kg. hydrocarbons. Under these conditions, the ethylene-propylene yield is highest. A steam dilution of 0.3–0.5 kg./kg. is especially favorable because a high yield of olefins is obtained with a small demand of steam, thus reducing costs for steam production.

If the temperatures during thermal cracking are too high, increased amounts of pyrolysis oil are formed, and undesirable deposits of coke and tar occur in the cracking unit. If the residence time is too long, the yield of the reaction decreases.

The apparatus used for the process is conventional. For example, the hydrogenation may be carried out in a continuous flow fixed bed reactor, being followed by thermal cracking in pipes which are heated by burners arranged at the side walls of a cracking reactor.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any what whatsoever. In the following examples, all temperatures are set forth uncorrected in degrees Celsius; unless otherwise indicated, all parts and percentages are by weight.

In the following examples, a gas oil having the following properties was employed as the starting material:

| | |
|---|---|
| Density: | 0.85 g./ml. |
| Total aromatics content | 27.7% by weight (11% by weight of polyaromation) |
| C Content: | 86.45% by weight |
| H Content: | 13.13% by weight |
| S Content: | 0.42% by weight |
| H/C Ratio: | 1.82 |
| Boiling range: | 208°–354° C. |

The production of the catalysts of this invention is described below with reference to several characteristic examples:

CATALYST A 1,500 g. of a commercially obtainable zeolite Y powder having an $SiO_2/Al_2O_3$ ratio of 4.8 was agitated for 1 hour at 90° C. with a solution containing 7,500 g. of $(NH_4)_2SO_4$ in 30 l. of water. After the exchange had taken place, the product was filtered off and washed free of sulfate. The exchange was repeated. The dried powder having an $Na_2O$ content of about 1% by weight was processed into molded components with $SiO_2$ as the binder.

222 g. of $WO_3.H_2O$ was stirred for 1 hour at 80° C. in a solution obtained by mixing a solution of 600 ml. of 25% ammonia solution, 240 ml. of water, and 30 g. of $NH_4NO_3$ with a solution of 262.5 g. of $Ni(NO_3)_2.6H_2O$ in 228 ml. of water. Thereafter ammonia was introduced in the gaseous phase in a gentle stream to effect the complete dissolution of $WO_3.H_2O$ for 80 minutes. The clear solution was subsequently filled up with water to 1,640 ml.

By means of the thus-prepared solution, 1,066 g. of the ammonium exchanged zeolite Y was impregnated under vacuum. Based on the amount of zeolite employed, 9.8% by weight of $WO_3$ and 3.2% by weight of NiO were thus absorbed. The impregnated granulated material was heated in an air stream at a heating rate of 50° C./h. to 420° C. and left at this temperature for 90 minutes.

CATALYST B

Pulverulent zeolite X of the composition 0.8 $Na_2O$·$Al_2O_3$·2.5 $SiO_2$ was shaped into spherical granules made up of about 80% zeolite and about 20% zeolite A in accordance with the process of DOS No. 2,016,838.

1,260 g. of the granulated material was treated with 4 l. of a solution of 404 g. of aqueous rare earth chloride (46% (r.e.)$_2O_3$) per liter for 5 hours at 70° C. The ion exchange was repeated twice. The granules were then washed and dried at 150° C.

A cobalt- or molybdenum-containing solution was prepared as follows: 612 g. of $MoO_3$ was dissolved in 738 ml. of concentrated ammonia solution and 804 ml. of water. 1,680 ml. of this solution was combined with 350 ml. of water and 518 g. of $Co(NO_3)_2.6H_2O$; undissolved proportions were dissolved by the introduction of gaseous ammonia.

For impregnating purposes, 2 l. of rare earth-exchanged granules was filled into a vacuum bottle which was then evacuated. The impregnating solution was introduced by means of a dropping funnel. After 1 hour of treatment time, intense vacuum-filtering was applied, the thus-impregnated granulated material was dried and activated at 400° C. Thereafter, the granulated material was introduced into a tubular furnace. At room temperature, the material was purged for one hour with nitrogen; then, the granulated material was heated in an $H_2S/H_2$ stream—(1:1 based on the gaseous volume)—to 420° C. within 2 hours, and sulfided under reducing conditions at this temperature for $3\frac{1}{2}$ hours.

The finished catalyst contained 3.1% CoO and 10.7% $MoO_3$ (as the sulfides).

CATALYST C

Granulated zeolite Y was converted into the rare earth form by following the procedure described in connection with catalyst B.

A nickel- and molybdenum-containing solution was prepared as follows: 208 g. of ammonium molybdate was dissolved in 385 ml. of water at 80° C. Then, a solution of 93.5 g. of $Ni(NO_3)_2.6H_2O$ in 280 ml. of water was added thereto; undissolved proportions were dissolved by introducing gaseous ammonia at room temperature.

One liter of the rare earth zeolite Y granules was impregnated with the entire quantity of the solution, subjected to intense vacuum-filtering, dried, and activated for 2 hours at 400° C. in a muffle furnace.

The finished catalyst contained 2.1% by weight of NiO and 14.5% by weight of $MoO_3$.

CATALYST D

Pulverulent zeolite Y having a composition of 0.8 $Na_2O.Al_2O_3.4.8SiO_2$ was processed into molded components with $SiO_2$.

One liter of this granulated material was exchanged with 2 l. of a circulating molar solution of $MgCl_2.6H_2O$ for 5 hours at 70° C. The exchange was repeated twice. Thereafter, the granules were washed and dried at 105° C.

An impregnating solution, containing nickel and tungsten, was prepared as follows: A solution of 174.6 g. of $Ni(NO_3)_2.6H_2O$ in 152 ml. of water was added to a solution of 20 g. of $NH_4NO_3$ in 400 ml. of concentrated ammonia and 160 ml. of water. 150 g. of $WO_3.H_2O$ was stirred into the combined solutions; then, ammonia was introduced at 80° C. until the mixture became completely clear, and the latter filled up to one liter after cooling.

The Mg-exchanged zeolite Y granules were impregnated with this solution under vacuum. Then, the mixture was vigorously vacuum-filtered, dried, and activated for 2 hours in a muffle furnace at 400° C.

The finished catalyst contained 4.6% NiO and 13.0% $WO_3$.

CATALYST ACCORDING TO THE PRIOR ART

For comparison with the prior art, a nickel/tungsten-silicic acid/alumina catalyst was produced analogously to Example 4 of DOS No. 2,164,951 as follows:

A commercially available silicic acid/alumina support with 7% $Al_2O_3$ and 93% $SiO_2$, a BET surface of 110 $m^2$/g. and a pore volume of 0.65 ml./g. was impregnated in the same way as described in connection with catalyst A with the analogous Ni/W impregnating solution, resulting in a content of 10.7% $WO_3$ and 3.6% NiO, based on the support employed. The thus-impregnated granulated material was dried at 120° C. and activated by heating to 350° C. Before exposing the material to gas oil, it was first reduced with hydrogen at the temperature of the catalytic reaction.

EXAMPLE 1

The gas oil was cracked thermally without any preceding hydrogenation according to the invention at 820° C. and at a steam-hydrocarbon ratio of 1.0 kg./kg. The residence time was 0.1 second; the pressure was 1 bar.
The following yield was obtained:

| $CH_4$: | 10.5% by weight |
|---|---|
| $C_2H_4$: | 21.0% by weight |
| $C_3H_6$: | 12.2% by weight |
| $C_{5+}$-fraction: | 42.0% by weight |

EXAMPLE 2

The gas oil was hydrogenated according to the process of this invention under the following conditions:

| Temperature: | 400° C. |
|---|---|
| Pressure: | 50 bar |
| Volume rate: | 1.7 $h^{-1}$ |
| Catalyst: (A): | Ni-W on decationized zeolite Y |

A product analysis yielded the following:

| Density: | 0.72 g./ml. |
|---|---|
| Total aromatics content: | 0.8% by weight |
| H/C Ratio: | 2.40 |
| S Content: | 0.01% by weight |
| Boiling range: | 75°-210° C. |

Thereafter the hydrogenation product was subjected to thermal cracking under the same conditions as in Example 1.
The following yield was obtained:

| $CH_4$: | 15.8% by weight |
|---|---|
| $C_2H_4$: | 31.0% by weight |
| $C_3H_6$: | 16.6% by weight |
| $C_{5+}$-fraction: | 18.2% by weight |

EXAMPLE 3

The gas oil was hydrogenated according to the process of this invention under the following conditions:

| Temperature: | 400° C. |
|---|---|
| Pressure: | 150 bar |
| Volume rate: | 5.1 $h^{-1}$ |
| Catalyst: (B): | Co—Mo—S on rare earth-exchanged zeolite X |

A product analysis yielded the following:

| Density: | 0.80 g./ml. |
|---|---|
| Total aromatics content: | 8.5% by weight |
| H/C Ratio: | 1.88 |
| S Content: | 0.08% by weight |
| Boiling range: | 110°-320° C. |

Thereafter, the hydrogenation product was subjected to thermal cracking under the same conditions as set forth in Example 1.
The following yield was obtained:

| $CH_4$: | 13.5% by weight |
|---|---|
| $C_2H_4$: | 28.2% by weight |
| $C_3H_6$: | 15.5% by weight |
| $C_{5+}$-fraction: | 26.4% by weight |

EXAMPLE 4

The gas oil was hydrogenated according to the process of the present invention under the following conditions:

| Temperature: | 400° C. |
|---|---|
| Pressure: | 50 bar |
| Volume rate: | 0.85 $h^{-1}$ |
| Catalyst: (C): | Ni—Mo on rare earth exchanged zeolite Y |

An analysis of the product yielded the following values:

| Density: | 0.77 g./ml. |
|---|---|
| Total aromatics content: | 0.70% by weight |
| H/C Ratio: | 2.12 |
| S Content: | <50 p.p.m. |
| Boiling range: | 45°-175° C. |

EXAMPLE 5

The gas oil was hydrogenated according to the process of this invention under the following conditions:

| Temperature: | 300° C. |
|---|---|
| Pressure: | 150 bar |
| Volume rate: | 0.85 $h^{-1}$ |
| Catalyst: (D): | Ni—W on Mg exchanged zeolite Y |

An analysis of the thus-obtained product yielded the following values:

| Density: | 0.82 g./ml. |
|---|---|
| Total aromatics content: | 6.5% by weight |
| H/C Ratio: | 1.89 |
| S Content: | 0.03% by weight |
| Boiling range: | 114°-345° C. |

EXAMPLE 6

This example shows the efficacy of the catalysts according to the prior art for the process of this invention. The aforedescribed gas oil was hydrogenated under the following conditions:

| Temperature: | 400° C. |
|---|---|
| Pressure: | 50 bar |
| Volume rate: | 0.85 $h^{-1}$ |
| Catalyst of the prior art, as described above. | |

An analysis of the product yielded the following values:

| | |
|---|---|
| Density: | 0.84 g./ml. |
| Total aromatics content: | 17.5% by weight |
| H/C Ratio: | 1.84 |
| S Content: | 0.12% by weight |
| Boiling range: | 185°–332° C. |

EXAMPLE 7

The gas oil was hydrogenated according to the process of this invention under the following conditions:

| | |
|---|---|
| Temperature: | 300° C. |
| Pressure: | 20 bar |
| Volume rate: | 1.7 h$^{-1}$ |
| Catalyst: | Ni—W—S on decationized zeolite Y |

A product analysis yielded:

| | |
|---|---|
| Density: | 0.82 g./ml. |
| Total aromatics content | 20.9% by weight |
| H/C Ratio: | 1.85 |
| S Content: | 0.09% by weight |
| Boiling range: | 165°–340° C. |

Thereafter, the hydrogenation product was subjected to thermal cracking under the same conditions as described in Example 1.
The following yield was obtained:

| | |
|---|---|
| $CH_4$: | 12.0% by weight |
| $C_2H_4$: | 23.6% by weight |
| $C_3H_6$: | 13.4% by weight |
| $C_{5+}$-fraction: | 35.8% by weight |

EXAMPLE 8

The gas oil was hydrogenated according to the present invention under the following conditions:

| | |
|---|---|
| Temperature: | 400° C. |
| Pressure: | 150 bar |
| Volume rate: | 5.1 h$^{-1}$ |
| Catalyst: | Co—Mo—S on rare earth exchanged zeolite X |

An analysis of the product yielded the following values:

| | |
|---|---|
| Density: | 0.80 g/ml |
| Total aromatics Content: | 8.5% by weight |
| H/C Ratio: | 1.88 |
| S Content: | 0.08% by weight |
| Boiling Range: | 110°–320° C. |

Thereafter, the hydrogenation product was subjected to thermal cracking. The steam-hydrocarbon ratio was 0.49 kg/kg and the other conditions were the same as described in Example 1.
The following yield was obtained:

| | |
|---|---|
| $CH_4$: | 13.5% by weight |
| $C_2H_4$: | 28.0% by weight |
| $C_3H_6$: | 15.4% by weight |
| $C_{5+}$-fraction: | 27.7% by weight |

EXAMPLE 9

The gas oil was hydrogenated according to the present invention under the following conditions:

| | |
|---|---|
| Temperature: | 400° C. |
| Pressure: | 50 bar |
| Volume rate: | 5.1 h$^{-1}$ |
| Catalyst: | Ni—W—S on H-exchanged zeolite Y |

An analysis of the product yielded the following values:

| | |
|---|---|
| Density: | 0.81 g/ml |
| Total aromatics content: | 8.3% by weight |
| H/C Ratio: | 1.87 |
| S Content: | 0.02 by weight |
| Boiling Range: | 120°–330° C. |

Thereafter, the hydrogenation product was subjected to thermal cracking. The steam-hydrocarbon ratio was 0.49 kg/kg and the other conditions were the same as described in Example 1.
The following yield was obtained:

| | |
|---|---|
| $CH_4$: | 13.1% by weight |
| $C_2H_4$: | 28.6% by weight |
| $C_3H_6$: | 15.6% by weight |
| $C_{5+}$-fraction: | 27.5% by weight |

EXAMPLE 10

The gas oil was hydrogenated according to the present invention under the following conditions:

| | |
|---|---|
| Temperature: | 420° C. |
| Pressure: | 50 bar |
| Volume rate: | 8.5 h$^{-1}$ |
| Catalyst: | Co—Mo—S on H-exchanged zeolite Y |

An analysis of the product yielded the following values:

| | |
|---|---|
| Density: | 0.81 g/ml |
| Total aromatics content: | 13.9% by weight |
| H/C Ratio: | 1.86 |
| S Content: | 0.10 |
| Boiling Range: | 115°–290° C. |

Thereafter, the hydrogenation product was subjected to thermal cracking. The steam-hydrocarbon ratio was 0.49 kg/kg and the other conditions were the same as described in Example 1.
The following yield was obtained:

| | |
|---|---|
| $CH_4$: | 12.5% by weight |

-continued

| | |
|---|---|
| $C_2H_4$: | 26.5% by weight |
| $C_3H_6$: | 15.0% by weight |
| $C_{5+}$-fraction: | 32.6% by weight |

EXAMPLE 11

The gas oil was hydrogenated according to the present invention under the following conditions:

| | |
|---|---|
| Temperature: | 450° C. |
| Pressure: | 80 bar |
| Volume rate: | 9.0 h$^{-1}$ |
| Catalyst: | Ni—Mo—S on rare earth exchanged zeolite Y |

An analysis of the product yielded the following values:

| | |
|---|---|
| Density: | 0.79 g/ml |
| Total aromatics Content: | 12.6% by weight |
| H/C Ratio: | 1.86 |
| S Content: | 0.11 |
| Boiling Range: | 80°–240° C. |

Thereafter, the hydrogenation product was subjected to thermal cracking. The steam-hydrocarbon ratio was 0.49 kg/kg and the other conditions were the same as described in Example 1.

The following yield was obtained:

| | |
|---|---|
| $CH_4$: | 12.6% by weight |
| $C_2H_4$: | 27.0% by weight |
| $C_3H_6$: | 15.2% by weight |
| $C_{5+}$-fraction: | 31.5% by weight |

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for the production of olefins in two stages wherein, in the first stage, a heavy petroleum fraction is hydrogenated essentially in the liquid phase in the presence of hydrogen and a hydrogenation catalyst and, in the second stage, the thus-hydrogenated fraction is subjected to thermal cracking in the vapor phase in the presence of steam, the improvement which comprises employing as the hydrogenation catalyst a zeolite of the faujasite structure combined with elements from Groups VIB, VIIB and VIII of the periodic table of the elements, wherein the alkali component of the zeolite is exchanged at least partially for ammonium, hydronium, alkaline earth and/or rare earth ions, and the elements are present in a metallic, ionic, oxidic and/or sulfidic form.

2. A process according to claim 1, wherein the hydrogenation catalyst consists essentially of (a) a zeolite with a faujasite structure, (b) cobalt, nickel and/or iron, and (c) molybdenum, tungsten and/or chromium.

3. A process according to claim 1, wherein the hydrogenation catalyst is a Ni—W catalyst on decationized zeolite Y.

4. A process according to claim 1, wherein the hydrogenation catalyst is a Co—Mo catalyst on decationized zeolite Y.

5. A process according to claim 1, wherein the hydrogenation catalyst is a Co—Mo—S catalyst on rare earth-exchanged zeolite X.

6. A process according to claim 1, wherein the hydrogenation catalyst is a Ni-W catalyst on rare earth-exchanged zeolite Y.

7. A process according to claim 1, wherein the hydrogenation catalyst is a Ni—W—S catalyst on decationized zeolite Y.

8. A process according to claim 1, wherein the hydrogenation catalyst is a Ni—W—S catalyst on rare earth-exchanged zeolite X.

9. A process according to claim 1, wherein the hydrogenation catalyst is a Ni—W—S catalyst on Ca-exchanged zeolite X.

10. A process according to claim 1, wherein the hydrogenation catalyst is a Co—Mo—S catalyst on Ca-exchanged zeolite X.

11. A process according to claim 1, wherein the hydrogenation catalyst is a Co—Mo—S catalyst on decationized zeolite Y.

12. A process according to claim 1, wherein the hydrogenation temperature is 100°–500° C.

13. A process according to claim 1, wherein the hydrogenation temperature is 200°–400° C.

14. A process according to claim 1, wherein the hydrogenation pressure is 10–300 bar.

15. A process according to claim 13, wherein the hydrogenation pressure is 15–150 bar.

16. A process according to claim 1, wherein the heavy petroleum fraction has a boiling range of 190°–380° C.

17. A process according to claim 1, wherein the heavy petroleum fraction has a boiling range of 380°–700° C.

18. A process according to claim 1, wherein the hourly volume rate of the heavy petroleum fraction is 0.2–10 h$^{-1}$.

19. A process according to claim 1, wherein the hourly volume rate of the heavy petroleum fraction is 1.5–10 h$^{-1}$.

20. A process according to claim 1, wherein resultant hydrogenated fraction is subjected to thermal cracking at a temperature of between 700° and 900° C., under a pressure of 1–4 bar, at a residence time of 0.01–1 second, and with a steam dilution of 0.2–4.0 kg. steam/kg. hydrocarbons.

21. A process according to claim 1, wherein the hourly volume rate of the heavy petroleum fractions is 5–10 h$^{-1}$.

22. A process according to claim 20, wherein the steam dilution is 0.3–0.5 kg. steam/kg. hydrocarbons.

* * * * *